(12) United States Patent
Li et al.

(10) Patent No.: US 12,744,801 B2
(45) Date of Patent: Sep. 22, 2026

(54) TEST CASE-BASED ANOMALY DETECTION WITHIN A COMPUTING ENVIRONMENT

(71) Applicant: INTERNATIONAL BUSINESS MACHINES CORPORATION, Armonk, NY (US)

(72) Inventors: Zhi Li, Beijing (CN); Xiao Dong Li, Beijing (CN); He Jiang Jia, Beijing (CN); Xing Xing Shen, Beijing (CN); Ye Tian, Dalian (CN); Sheng Jie Han, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 96 days.

(21) Appl. No.: 18/159,703

(22) Filed: Jan. 26, 2023

(65) Prior Publication Data

US 2024/0259408 A1 Aug. 1, 2024

(51) Int. Cl.
*H04L 9/40* (2022.01)
*H04L 41/16* (2022.01)

(52) U.S. Cl.
CPC .......... *H04L 63/1425* (2013.01); *H04L 41/16* (2013.01)

(58) Field of Classification Search
CPC ............................ H04L 63/1425; H04L 41/16
See application file for complete search history.

(56) References Cited

U.S. PATENT DOCUMENTS 9,558,464 B2 1/2017 Bassin et al.
9,740,478 B2 8/2017 Doganata et al.
9,921,952 B2 3/2018 Dean et al.
10,116,521 B2* 10/2018 Kokkula ............. H04L 41/0813
10,754,640 B2 8/2020 Woulfe et al.
10,769,009 B2 9/2020 Luo et al.
11,151,024 B2 10/2021 Hwang et al.
2017/0104774 A1* 4/2017 Vasseur .................. G06N 20/00
2020/0028862 A1* 1/2020 Lin ....................... H04L 63/104
2020/0322367 A1* 10/2020 Salvat Lozano .... H04L 41/5009
2021/0058424 A1* 2/2021 Chang ................. G06F 11/3409

(Continued)

OTHER PUBLICATIONS

Ali et al., "Classification and Prediction of Software Incidents Using Machine Learning Techniques", Security and Communication Networks, https://www.hindawi.com/journals/scn/2021/9609823/, published Jan. 1, 2021 (16 pages) (Year: 2021).

(Continued)

*Primary Examiner* — Oleg Korsak

(74) *Attorney, Agent, or Firm* — Lily Neff, Esq; Kevin P. Radigan, Esq.; Heslin Rothenberg Farley & Mesiti P.C.

(57) ABSTRACT

Processing within a computing environment is facilitated by using a machine learning implicit-anomaly model to determine a possibility of an implicit anomaly within a system based on system metrics data obtained during running of one or more test cases on the system. The process further includes determining, using artificial intelligence, occurrence of an incident within the system associated with running of the one or more test cases. Determining the occurrence of the incident uses the determined possibility of the implicit anomaly within the system based on the system metrics data, and the process further includes initiating an action based on the occurrence of the incident within the system with running of the one or more test cases.

20 Claims, 15 Drawing Sheets

(56) References Cited

U.S. PATENT DOCUMENTS

2021/0089649 A1* 3/2021 Subramanyam ...... G06F 21/552
2021/0211447 A1* 7/2021 Albero ................... G06N 20/00
2022/0303291 A1* 9/2022 Baldini Das Neves ..................... G06N 5/022
2025/0363367 A1* 11/2025 Galvin ................... G06N 3/045
2026/0003746 A1* 1/2026 Jiang ....................... G06F 11/20

OTHER PUBLICATIONS

Anonymous, "A Method to Adaptively Predict Upcoming Bugs and Automatically Trace Root Cause of a Bug", ip.com, IPCOM000267759D, https://priorart.ip.com/IPCOM/000267759, published Nov. 20, 2021 (6 pages) (Year: 2021).

* cited by examiner

FIG. 1

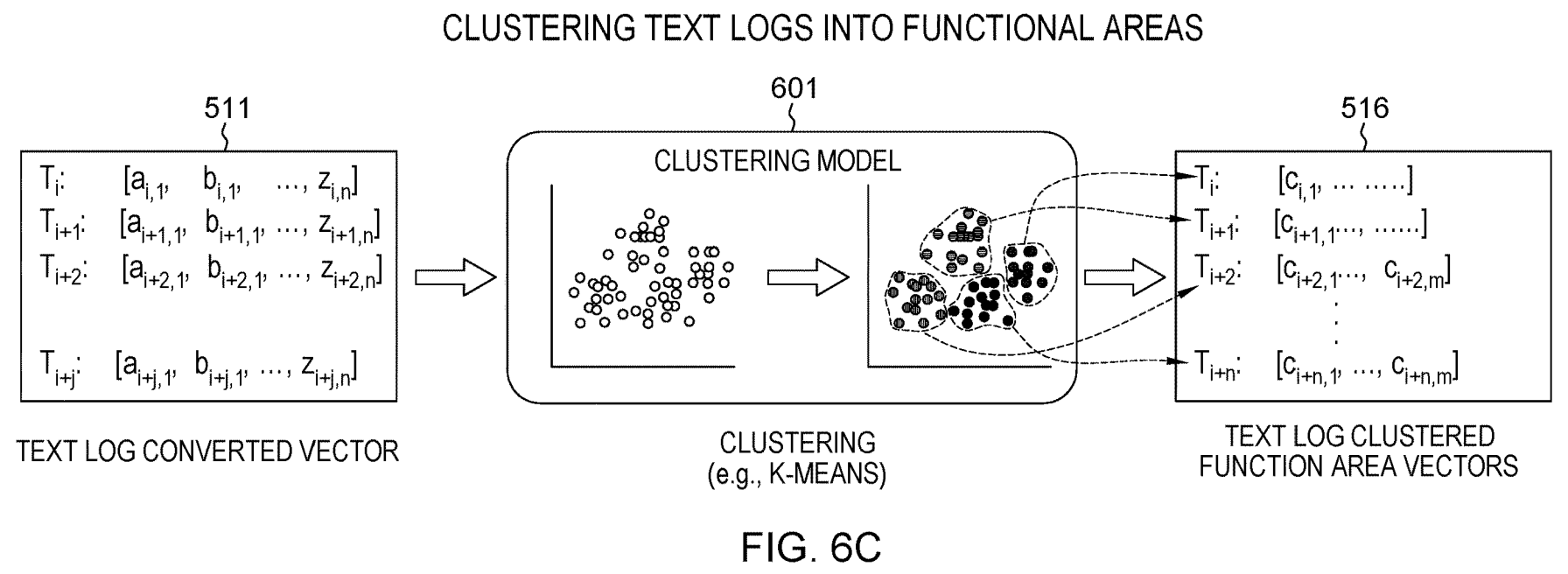

CLUSTERING TEXT LOGS INTO FUNCTIONAL AREAS

511

$T_i$: $[a_{i,1}, b_{i,1}, \ldots, z_{i,n}]$
$T_{i+1}$: $[a_{i+1,1}, b_{i+1,1}, \ldots, z_{i+1,n}]$
$T_{i+2}$: $[a_{i+2,1}, b_{i+2,1}, \ldots, z_{i+2,n}]$
$T_{i+j}$: $[a_{i+j,1}, b_{i+j,1}, \ldots, z_{i+j,n}]$

TEXT LOG CONVERTED VECTOR

601

CLUSTERING MODEL

CLUSTERING
(e.g., K-MEANS)

516

$T_i$: $[c_{i,1}, \ldots \ldots]$
$T_{i+1}$: $[c_{i+1,1}, \ldots, \ldots]$
$T_{i+2}$: $[c_{i+2,1}, \ldots, c_{i+2,m}]$
$T_{i+n}$: $[c_{i+n,1}, \ldots, c_{i+n,m}]$

TEXT LOG CLUSTERED
FUNCTION AREA VECTORS

FIG. 6C

CLASSIFY PERFORMANCE ROBUSTNESS (PR) VECTORS WITH FUNCTIONAL AREA DATA $T_i$: $[p_i, r_1]$
$T_{i+1}$: $[p_{i+1}, r_{i+1}]$
$T_{i+2}$: $[p_{i+2}, r_{i+2}]$
⋮
$T_{i+n}$: $[p_{i+n}, r_{i+n}]$ $T_i$: $[c_{i,1}, \ldots, c_{i,m}]$
$T_{i+1}$: $[c_{i+1,1} \ldots, c_{i+1,m}]$
$T_{i+2}$: $[c_{i+2,1} \ldots, c_{i+2,m}]$
⋮
$T_{i+n}$: $[c_{i+n,1}, \ldots, c_{i+n,m}]$

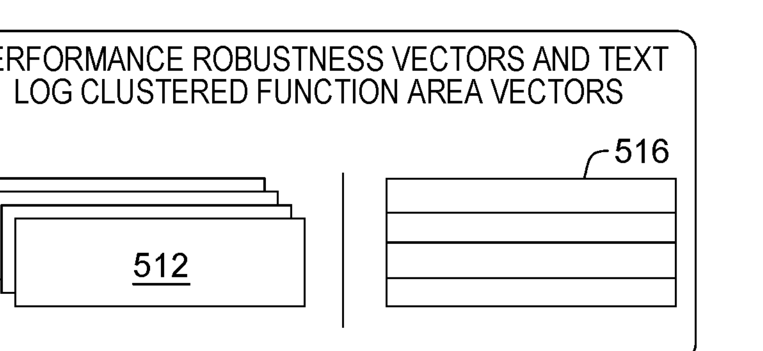

$T_i$: $[c_{i,1}, \ldots, c_{i,m}, p_i, r_i]$
$T_{i+1}$: $[c_{i+1,1} \ldots, c_{i+1,m}, p_{i+1}, r_{i+1}]$
$T_{i+2}$: $[c_{i+2,1} \ldots, c_{i+n,m}, p_{i+2}, r_{i+2}]$
⋮
$T_{i+n}$: $[c_{i+n,1}, \ldots, c_{i+n,m}, p_{i+n}, r_{i+n}]$

FUNCTIONAL AREA CLASSIFIED PERFORMANCE ROBUSTNESS VECTORS

| MESSAGE ID OR KEYWORD | TIME STAMP | TEXT | SEVERITY |
|---|---|---|---|
| CWWKS2911E | t1 | SAF Service RACROUTE_AUTH did not succeed..... | 100 |
| SRVE8115W | t2 | Exception thrown by application class 'co....... | 100 |
| ....... | | | |

TEST CASE-BASED ANOMALY DETECTION WITHIN A COMPUTING ENVIRONMENT

BACKGROUND

One or more aspects relate, in general, to enhancing processing within a computing environment, and in particular to facilitating anomaly-based incident detection, including implicit-anomaly and explicit-anomaly incident detection with running one or more test cases within a system, such as of a development and operational (DevOps) computing environment.

DevOps is a software application development methodology that emphasizes automation, integration, collaboration and communication between development and operational stages of the software life cycle. A key measure of DevOps success is the quality of the resultant software and system developed with the DevOps method.

A DevOps method for software development and operation can include planning and design testing, including planning and designing one or more test cases, coding the test cases, building and deploying a test infrastructure, running the designed end-to-end tests, releasing the software product, deploying the software on a production system and running the test cases on the production system during operation of the production system, monitoring and collecting data from the production system, such as for identifying a missing test, and end-to-end orchestration of the DevOps pipeline.

SUMMARY

Certain shortcomings of the prior art are overcome, and additional advantages are provided herein through the provision of a computer-implemented method of facilitating processing within a computing environment. The computer-implemented method includes: using a machine learning implicit-anomaly model to determine a possibility of an implicit anomaly within a system based on system metrics data obtained during running of one or more test cases on the system. In addition, the computer-implemented method includes determining, using artificial intelligence, an occurrence of an incident within the system associated with running of the one or more test cases, where determining the occurrence of the incident uses the determined possibility of the implicit anomaly within the system based on the system metrics data, and initiating an action based on the occurrence of the incident within the system associated with running of the one or more test cases.

Computer systems and computer program products relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 1 depicts one example of a computing environment to include and/or use one or more aspects of the present invention;

FIGS. 6A-6E depict one embodiment of a workflow for determining a possibility of an implicit anomaly within a system based on system metrics data obtained during running of one or more test cases on the system, in accordance with one or more aspects of the present invention;

DETAILED DESCRIPTION

Figure 2:
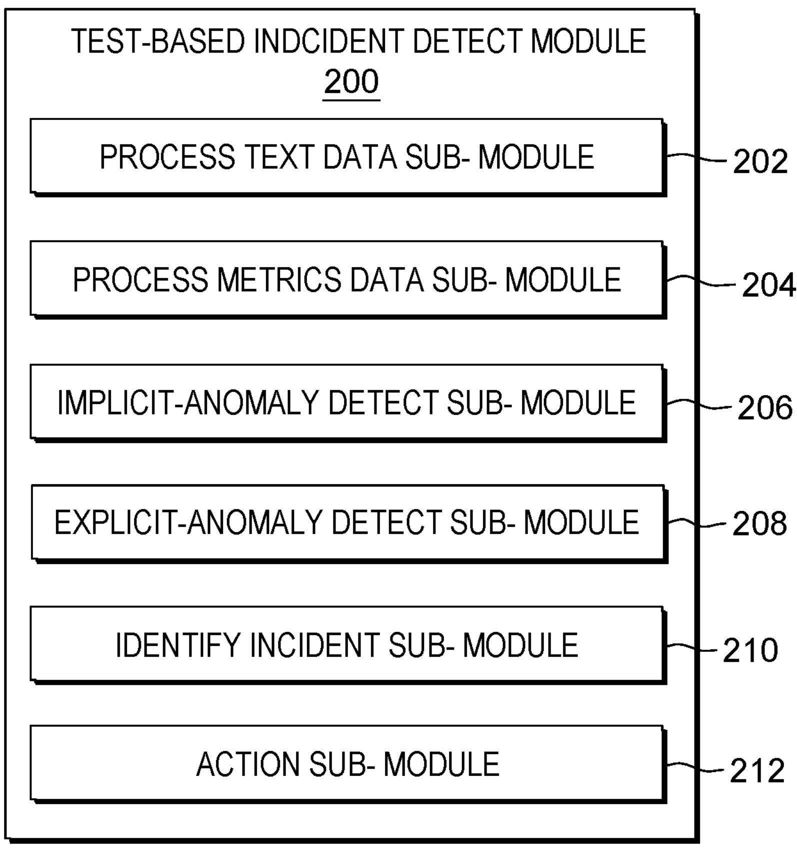
FIG. 2 depicts one embodiment of a computer program product with a test-based incident detect module, in accordance with one or more aspects of the present invention.

The accompanying figures, which are incorporated in and form a part of this specification, further illustrate the present invention and, together with this detailed description of the invention, serve to explain aspects of the present invention. Note in this regard that descriptions of well-known systems, devices, processing techniques, etc., are omitted so as to not unnecessarily obscure the invention in detail. It should be understood, however, that the detailed description and this specific example(s), while indicating aspects of the invention, are given by way of illustration only, and not limitation. Various substitutions, modifications, additions, and/or other arrangements, within the spirit or scope of the underlying inventive concepts will be apparent to those skilled in the art from this disclosure. Note further that numerous inventive aspects or features are disclosed herein, and unless inconsistent, each disclosed aspect or feature is combinable with any other disclosed aspect or feature as desired for a particular application of the concepts disclosed.

Note also that illustrative embodiments are described below using specific code, designs, architectures, protocols, layouts, schematics, or tools only as examples, and not by way of limitation. Furthermore, the illustrative embodiments are described in certain instances using particular software, hardware, tools, or data processing environments only as example for clarity of description. The illustrative embodiments can be used in conjunction with other comparable or similarly purposed structures, systems, applications, or architectures. One or more aspects of an illustrative embodiment can be implemented in software, hardware, or a combination thereof.

Figure 1:
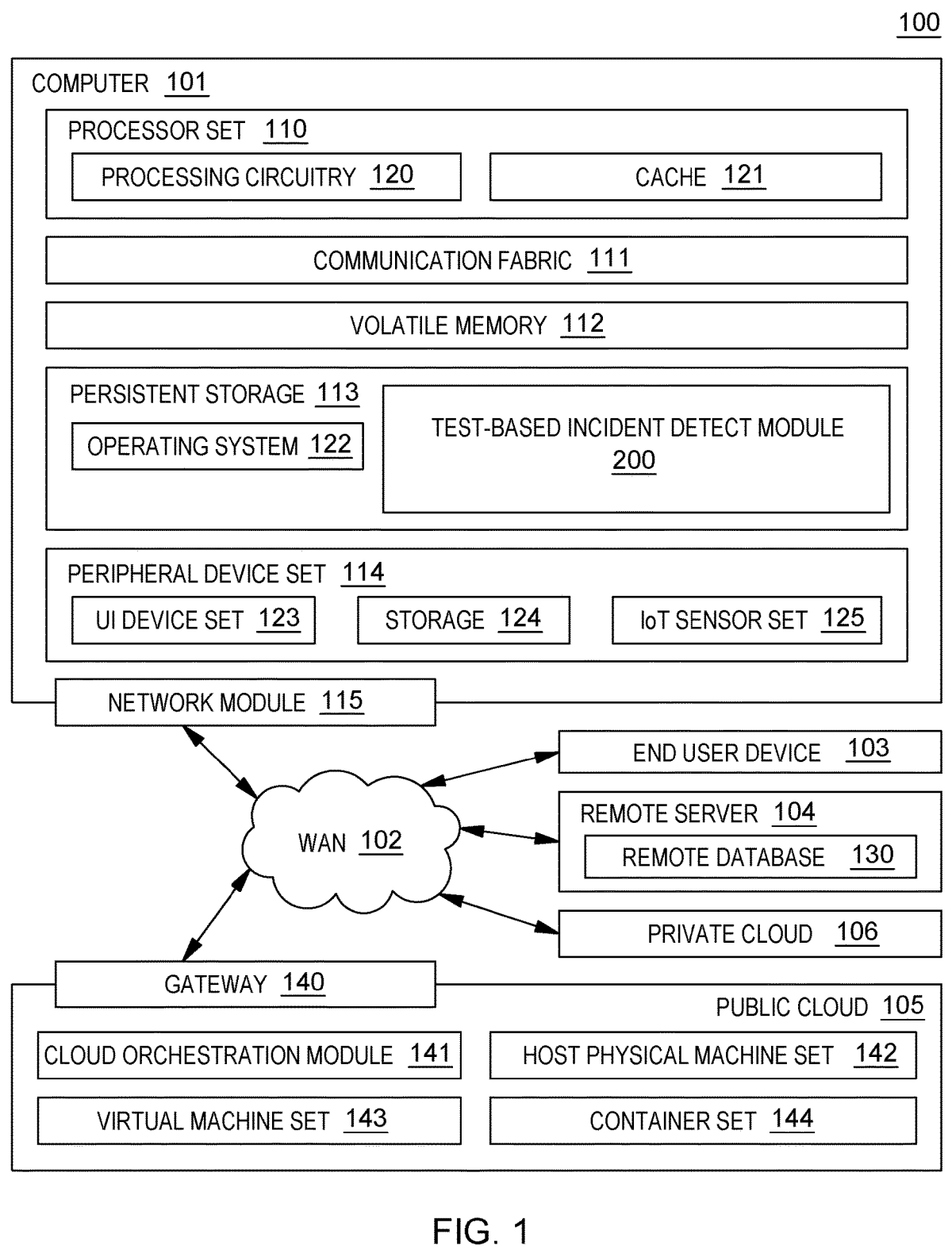

As understood by one skilled in the art, program code, as referred to in this application, can include software and/or hardware. For example, program code in certain embodiments of the present invention can utilize a software-based implementation of the functions described, while other embodiments can include fixed function hardware. Certain embodiments combine both types of program code. Examples of program code, also referred to as one or more programs, are depicted in FIG. 1, including operating system 122 and test-based incident detect module 200, which are stored in persistent storage 113.

One or more aspects of the present invention are incorporated in, performed and/or used by a computing environment. As examples, the computing environment can be of various architectures and of various types, including, but not limited to: personal computing, client-server, distributed, virtual, emulated, partitioned, non-partitioned, cloud-based, quantum, grid, time-sharing, clustered, peer-to-peer, mobile, having one node or multiple nodes, having one processor or multiple processors, and/or any other type of environment and/or configuration, etc., that is capable of executing a process (or multiple processes) that, e.g., perform automated container name identification processing, such as disclosed herein. Aspects of the present invention are not limited to a particular architecture or environment.

Prior to further describing detailed embodiments of the present invention, an example of a computing environment to include and/or use one or more aspects of the present invention is discussed below with reference to FIG. 1.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as test-based incident detect module block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 126 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The computing environment described above is only one example of a computing environment to incorporate, perform and/or use one or more aspects of the present invention. Other examples are possible. Further, in one or more embodiments, one or more of the components/modules of FIG. 1 need not be included in the computing environment and/or are not used for one or more aspects of the present invention. Further, in one or more embodiments, additional and/or other components/modules can be used. Other variations are possible.

Figure 3:
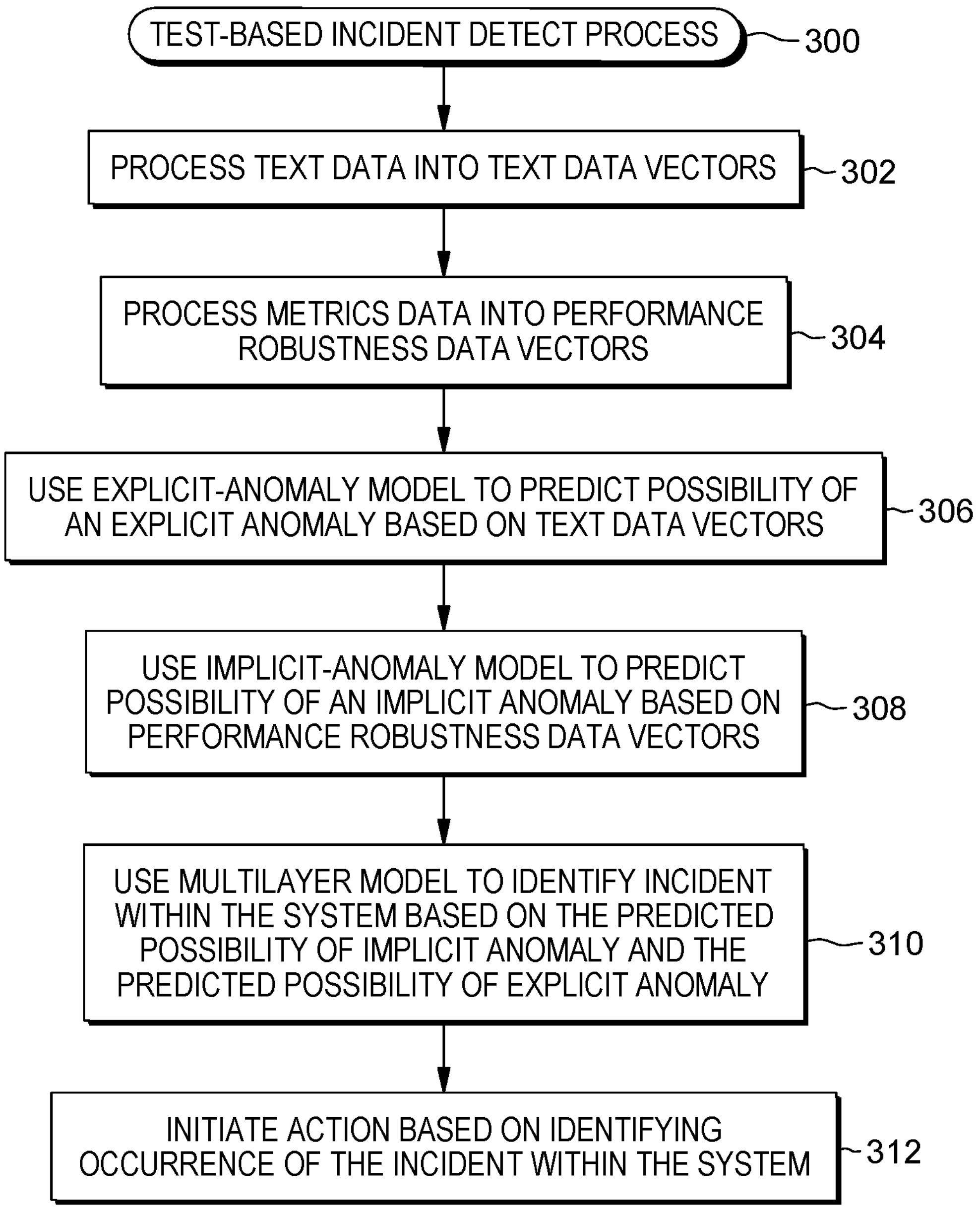
FIG. 3 depicts one embodiment of a test-based incident detect process, in accordance with one or more aspects of the present invention.

By way of example, one or more embodiments of a test-based (or test case-based) incident detect module and process are described initially with reference to FIGS. 2-3. FIG. 2 depicts one embodiment of test-based incident detect module 200 that includes code or instructions to perform incident detect processing, in accordance with one or more aspects of the present invention, and FIG. 3 depicts one embodiment of a test-based incident detect process, in accordance with one or more aspects of the present invention.

Referring to FIGS. 1 & 2, test-based incident detect module 200 includes, in one example, various sub-modules used to perform automated incident detect processing, in accordance with one or more aspects of the present invention. The sub-modules are, e.g., computer-readable program code (e.g., instructions) and computer-readable media (e.g., persistent storage (e.g., persistent storage 113, such as a disk) and/or a cache (e.g., cache 121), as examples). The computer-readable media can be part of a computer program product and can be executed by and/or using one or more computers, such as computer(s) 101; processors, such as a processor of processor set 110; and/or processing circuitry, such as processing circuitry of processor set 110, etc.

In the FIG. 2 embodiment, example sub-modules of test-based incident detect module 200 include, for instance, a process text data sub-module 202 to process output log or text data into text vectors for use by the incident detect process; a process metrics data sub-module 204 to convert performance metrics data into system metrics vector data to facilitate implicit anomaly detect processing; an implicit-anomaly detect sub-module 206 to predict a possibility of an implicit error within the system; an explicit-anomaly detect sub-module 208 to determine a possibility of an explicit anomaly within the system; an identify incident sub-module 210 to identify or determine likelihood of an incident within the system using the determined possibility of implicit anomaly within the system, based on the system metrics data, and the determined possibility of explicit anomaly within the system, based on the system text data; and an action sub-module 212 to, for instance, initiate an action (such as a dynamic tuning of the system) based on identifying occurrence of the incident within the system. Advantageously, detecting incidents, or errors, within the system and initiating one or more actions based on identifying occurrence of an incident can facilitate processing within the computing environment by, for instance, enhancing and/or extending system operation, potentially reducing system downtime, etc. Note that although various sub-modules are described, automated incident detect module processing such as disclosed herein can use, or include, additional, fewer, and/or different sub-modules. A particular sub-module can include additional code, including code of other sub-modules, or less code. Further, additional and/or other modules can be used. Many variations are possible.

In one or more embodiments, the sub-modules are used, in accordance with one or more aspects of the present invention, to perform incident detect processing. FIG. 3 depicts one example of an automated test-based incident detect process, such as disclosed herein. The process is executed, in one or more examples, by a computer (e.g., computer 101 (FIG. 1)), and/or a processor or processing circuitry (e.g., of processor set 110 of FIG. 1). In one example, code or instructions implementing the process, are part of a module, such as test-based incident detect module 200. In other examples, the code can be included in one or more other modules and/or in one or more sub-modules of the one or more other modules. Various options are available.

As one example, test-based incident detect process 300 executing on a computer (e.g., computer 101 of FIG. 1), a processor (e.g., a processor of processor set 110 of FIG. 1), and/or processing circuitry (e.g., processing circuitry of processor set 110), processes text data into text data vectors 302, which can include collecting and parsing text output files of a system running one or more test cases, such as one or more software test cases, and converting the text data of the system running the one or more test cases into the text data vectors. Further, test-based incident detect process 300 includes processing metrics data of the system running the one or more test cases into performance-robustness data vectors 304, which can include collecting performance metrics data and generating performance-robustness vectors from the data, clustering text logs into functional areas, and classifying the performance-robustness vectors with the functional area data, in one embodiment.

A machine learning explicit-anomaly model is used, in one embodiment, to determine possibility of an explicit anomaly within the system running the one or more test cases based on text data vectors 306, and a machine learning implicit-anomaly model is used, in one embodiment, to determine a possibility of an implicit anomaly within the system running the one or more test cases based on the performance-robustness data vectors 308. In one or more implementations, artificial intelligence is used, such as a multilayer machine learning model, to identify presence of an incident within the system based on the determined possibility of implicit anomaly and/or the determined possibility of explicit anomaly 310. In one embodiment, the incident detect process includes initiating an action based on identifying occurrence of the incident within the system with running of the one or more test cases 312.

In one embodiment, the action can be one or more corrective actions to remediate a risk associated with a detected incident. For instance, a workaround action, and/or deferral of a workaround action with incident reporting, can be initiated to remediate or document a system's current test case associated performance state. For instance, if the incident is reported for performance metric data indicating that memory of the system is about to be exhausted, the action can be to automatically temporarily assign additional memory within, or to, the system, mount backup storage space as a swap space, and/or notify one or more system applications to save data immediately in case program memory is recycled by the system, to avoid data loss. In one example, the action is initiated or performed by a computer (e.g., computer 101 (FIG. 1)), a processor of a processor set (e.g., processor set 110), and/or processing circuitry of a processor set (e.g., processor set 110), of the computing environment, with the computer being part of or different from the system running the one or more test cases. Alternatively, or additionally, an indication can be sent to an operator or other entity that oversees the system or environment. Based on initiating a generated action, the action is performed. This action can be performed automatically (e.g., using computer code, electronic devices, robotic devices, etc.) and/or manually, depending on the action. Many possibilities exist.

As noted initially, a development and operational (DevOps) computing environment is a combination of development and operation systems. A DevOps implementation optimizes communication, collaboration and integration between development and operation systems. By automating software delivery and architecture change processes, DevOps makes building, testing and releasing software faster, more frequent, and more reliable. Since development and operational code run in different environments, issues can arise in a specific environment. This is true even though one or more test systems used are configured similarly to the one or more production or operational systems. In practice, there can be test environment differences, such as configuration differences, and/or software usage differences, resource usage differences, etc. Note in this regard that, the workflows described herein can be run on both test system(s) and the production system(s). Further, note that when training the machine learning models described herein, both test systems and production systems can be used in the training process.

In executing test cases (such as software or application test cases) on a variety of systems, it has been observed that one or more test cases can trigger abnormalities or problems on a system that fail to trigger a failure of the test case. Even if the test case passes verification, performance metrics data of the system (or logs of associated components, network call stacks, etc., of the system) can be used to identify fluctuations or abnormalities that can be captured and used by machine learning models in incident detect processes, such as disclosed herein. The presence of implicit-anomalies or implicit errors can appear during data analysis of, for instance, system metrics data, but not be covered by the "verification point" of a normal test case instance. Similarly, the presence of explicit-anomalies or explicit errors can appear during analysis of, for instance, system text data not covered by the verification point of the normal test case instance. For example, the document responsive test case can be correct, but other dependent components could generate a text error message which is overlooked by the test case automation process.

In one or more implementations, to advantageously use such data-analysis-based information, processing is implemented to, for instance, continuously extract a large variety of text data and performance metrics data features generated by, for instance, the development system and/or production system, and use the commonness of features to assist automated testing in determining or judging by machine learning models whether there are potential product defects from the test case(s) running in the current system (i.e., current environment, such as a test system or a production system). In one embodiment, the process can use text logs and performance metrics data generated in the process of developing and even debugging programs to help solve possible problems, for instance, in code running on the test environment. Similarly, text logs and performance metrics data generated in the production system or environment can also be used to assist, for instance, in detecting new incidents or anomalies that can be addressed in the production and/or development stage. Note in this regard that, in one or more embodiments, each test system has its own hardware configuration and software configuration, with the software configuration including both operating system configuration and software product configuration. The test system(s) is configured, in one embodiment, similarly to the production system, although in practice, there will be differences, such as configuration differences or software usage or data differences. In practice, the test system configurations are designed to emulate the production system configurations. In testing, one objective is to configure the test system(s) as similar to the production system(s) as possible.

Part of the reason why new anomalies can be found on a production system is that the production system is inherently different from the test system, including workload, capacity, complexity of the system, etc. Another reason is that anomalies or errors can be undetected by the test case parameters. For instance, a response result of a test case can be correct, but the test case can cause other dependent component error messages, which are not watched by the test automation, which typically analyzes data of the software or application only.

In one or more implementations, disclosed herein are intelligent, machine-learning-based process to discover implicit and explicit abnormalities on either the test system or the production system, by collecting all relevant data of the system, which is quantized and analyzed (by machine learning models) to detect incidents or errors that are happening on the system, or that would happen on the production system. In this manner, the success of the test case is not be judged as the result of the test case only, but rather, hidden incidents or events, such as abnormalities or errors within the system, are also uncovered. In one implementation, system data is quantized during the test stage of a software development and operations lifecycle. For instance, all system data of interest during running of the test cases on different test systems can be accessed and quantized including, for instance, operation system logs, dependent component logs, application logs, text case execution time, CPU usage, memory usage, input/output parameters, network state, etc. The quantized data is then used to train multiple machine learning models, and used by the multiple trained machine learning models in identifying occurrence of an incident or error within the system with running of one or more test cases, and initiating an action based on identifying occurrence of the incident.

Figure 4:
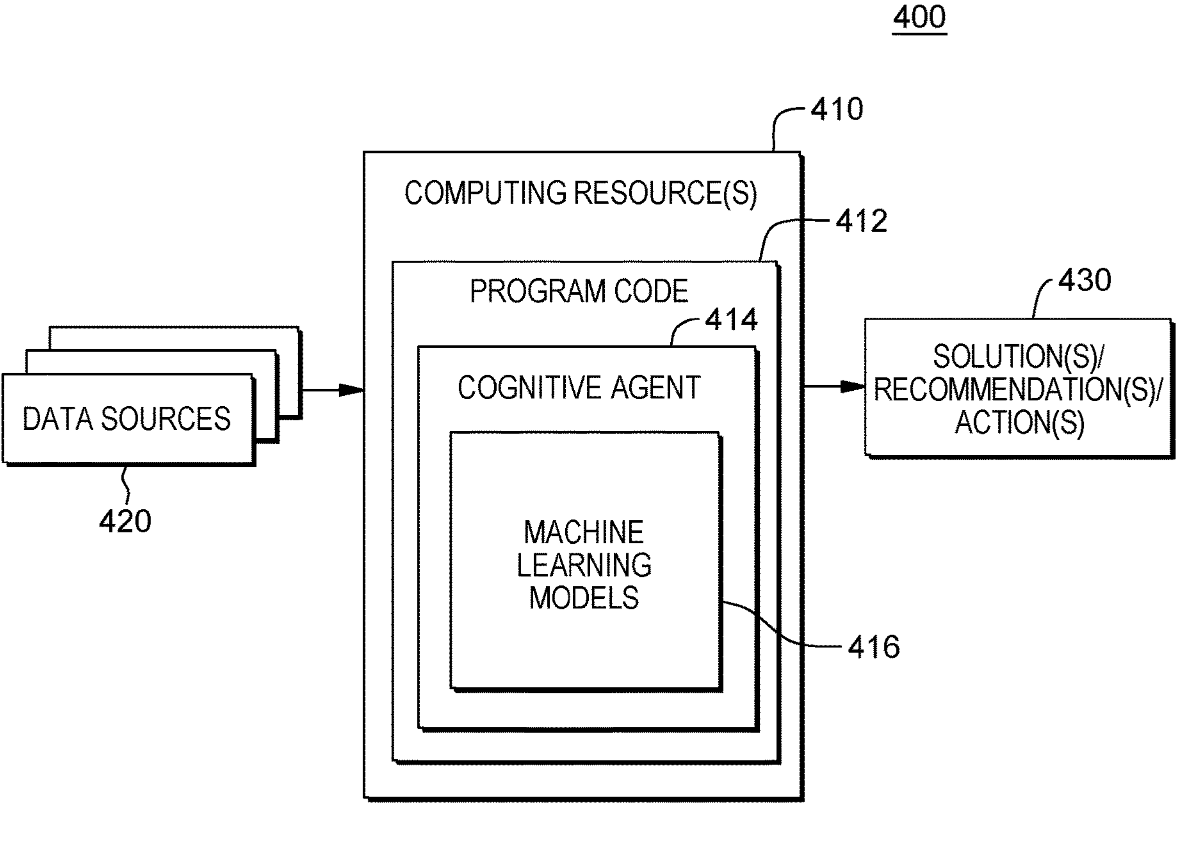
FIG. 4 is a further example of a computing environment to include and/or use one or more aspects of the present invention.

By way of further explanation, FIG. 4 depicts another embodiment of a computing environment or system 400, which can incorporate, or implement, one or more aspects of an embodiment of the present invention. In one or more implementations, system 400 is implemented as part of a computing environment, such as computing environment 100 described above in connection with FIG. 1. System 400 includes one or more computing resources 410 that execute program code 412 that implements, for instance, one or more aspects of a module or facility such as disclosed herein, and which includes a cognitive engine or agent 414, which utilizes machine learning models 416, such as described herein. Data, such as text data, performance metrics data or other data discussed herein, is used by cognitive agent 414, to train models 416 to (for instance) determine a possibility of an implicit anomaly within a system based on system metrics data obtained during running one or more test cases on the system, determine a possibility of an explicit anomaly within the system based on system text data obtained from running the one or more test cases on the system, identify or predict occurrence of an incident within the system based on running the one or more test cases on the system, initiate an action based on identifying occurrence of the incident within the system with running of the one or more test cases, and/or other related actions 430, etc., based on the particular application of the machine-learning model(s) to facilitate achieving the incident detect workflow disclosed. In implementation, system 400 can include, or utilize, one or more networks for interfacing various aspects of computing resource(s) 410, as well as one or more data sources 420 providing data, and one or more components, systems, etc., receiving an output, action, etc., 430 of machine learning models 416. By way of example, the network(s) can be, for instance, a telecommunications network, a local-area network (LAN), a wide-area network (WAN), such as the Internet, or a combination thereof, and can include wired, wireless, fiber-optic connections, etc. The network(s) can include one or more wired and/or wireless networks that are capable of receiving and transmitting data, including training data for the machine-learning model, and an output solution, recommendation, action, of the machine-learning model, such as discussed herein.

In one or more implementations, computing resource(s) 410 house and/or execute program code 412 configured to perform methods in accordance with one or more aspects of the present invention. By way of example, computing resource(s) 410 can be a computing-system-implemented resource(s). Further, for illustrative purposes only, computing resource(s) 410 in FIG. 4 is depicted as being a single computing resource. This is a non-limiting example of an implementation. In one or more other implementations, computing resource(s) 410, by which one or more aspects of incident detect processing, such as discussed herein can, at least in part, be implemented in multiple separate computing resources or systems, such as one or more computing resources of a cloud-hosting environment, by way of example.

Briefly described, in one embodiment, computing resource(s) 410 can include one or more processors, for instance, central processing units (CPUs). Also, the processor(s) can include functional components used in the integration of program code, such as functional components to fetch program code from locations in such as cache or main memory, decode program code, and execute program code, access memory for instruction execution, and write results of the executed instructions or code. The processor(s) can also include a register(s) to be used by one or more of the functional components. In one or more embodiments, the computing resource(s) can include memory, input/output, a network interface, and storage, which can include and/or access, one or more other computing resources and/or databases, as required to implement the machine-learning processing described herein. The components of the respective computing resource(s) can be coupled to each other via one or more buses and/or other connections. Bus connections can be one or more of any of several types of bus structures, including a memory bus or a memory controller, a peripheral bus, an accelerated graphics port, and a processor or local bus, using any of a variety of architectures. By way of example, but not limitation, such architectures can include the Industry Standard Architecture (ISA), the micro-channel architecture (MCA), the enhanced ISA (EISA), the Video Electronic Standard Association (VESA), local bus, and peripheral component interconnect (PCI). As noted, examples of a computing resource(s) or a computer system (s) which can implement one or more aspects disclosed are described further herein with reference to the figures.

In one embodiment, program code 412 executes a cognitive engine or agent 414 which includes and trains one or more models 416. The models can be trained using training data that can include a variety of types of data, depending on the model and the data sources. In one or more embodiments, program code 412 executing on one or more computing resources 410 applies one or more algorithms of cognitive agent 414 to generate and train the model(s), which the program code then utilizes to predict, for instance, possibility of an implicit anomaly within a system based on system metrics data obtained during running of one or more test cases on the system, possibility of an explicit anomaly within the system based on system text data obtained from running the one or more test cases on the system, identify occurrence of an incident within the system, etc., and depending on the application, to perform an action (e.g., initiate or perform error remediation, make a recommendation, issue an alert, etc.). In an initialization or learning stage, program code 412 trains one or more machine learning models 416 using obtained training data that can include, in one or more embodiments, text logs, performance metrics data, etc., such as described herein.

Data used to train the models (in one or more embodiments of the present invention) can include a variety of types of data, such as heterogeneous data generated by one or more data sources and/or data stored in one or more logs, or accessible by, the computing resource(s). Program code, in embodiments of the present invention, can perform data analysis to generate data structures, including algorithms utilized by the program code to predict and/or perform an action. As known, machine-learning-based modeling solves problems that cannot be solved by numerical means alone. In one example, program code extracts features/attributes from training data, which can be stored in memory or one or more databases. The extracted features can be utilized to develop a predictor function, h(x), also referred to as a hypothesis, which the program code utilizes as a model. In identifying machine learning model(s) 416, various techniques can be used to select features (elements, patterns, attributes, etc.), including but not limited to, diffusion mapping, principal component analysis, recursive feature elimination (a brute force approach to selecting features), and/or a random forest, to select the attributes related to the particular model. Program code can utilize one or more algorithms to train the model(s) (e.g., the algorithms utilized by program code), including providing weights for conclusions, so that the program code can train any predictor or performance functions included in the model. The conclusions can be evaluated by a quality metric. By selecting a diverse set of training data, the program code trains the model to identify and weight various attributes (e.g., features, patterns) that correlate to enhanced performance of the model.

In one or more embodiments, program code, executing on one or more processors, utilizes an existing cognitive analysis tool or agent (now known or later developed) to tune the model, based on data obtained from one or more data sources. In one or more embodiments, the program code can interface with application programming interfaces to perform a cognitive analysis of obtained data. Specifically, in one or more embodiments, certain application programing interfaces include a cognitive agent (e.g., learning agent) that includes one or more programs, including, but not limited to, natural language classifiers, a retrieve-and-rank service that can surface the most relevant information from a collection of documents, concepts/visual insights, tradeoff analytics, document conversion, and/or relationship extraction. In an embodiment, one or more programs analyze the data obtained by the program code across various sources utilizing one or more of a natural language classifier, retrieve-and-rank application programming interfaces, and tradeoff analytics application programing interfaces.

In one or more embodiments of the present invention, the program code can utilize a neural network to analyze training data and/or collected data to generate an operational machine-learning model. Neural networks are a programming paradigm which enable a computer to learn from observational data. This learning is referred to as deep learning, which is a set of techniques for learning in neural networks. Neural networks, including modular neural networks, are capable of pattern (e.g., state) recognition with speed, accuracy, and efficiency, in situations where datasets are mutual and expansive, including across a distributed network, including but not limited to, cloud computing systems. Modern neural networks are non-linear statistical data modeling tools. They are usually used to model complex relationships between inputs and outputs, or to identify patterns (e.g., states) in data (i.e., neural networks are non-linear statistical data modeling or decision-making tools). In general, program code utilizing neural networks can model complex relationships between inputs and outputs and identified patterns in data. Because of the speed and efficiency of neural networks, especially when parsing multiple complex datasets, neural networks and deep learning provide solutions to many problems in multi-source processing, which program code, in embodiments of the present invention, can utilize in implementing a machine-learning model, such as described herein.

As discussed, DevOps is a software development methodology that emphasizes automation, integration, collaboration and communication in the development and operational stages of a software product and system running the product. Traditional test automation focuses on verification of predefined expected results, which can result in explicit error messages or status return codes. However, there are also implicit issues or anomalies that are difficult to be predefined as expected results. Sometimes, an error is only reported on the test (or development) system, or on the production (or operation) system. If a problem only occurs in operation, then it is difficult to create and run an automation case to cover the regression test for the problem.

Addressing the above-noted technical challenges, disclosed herein are processes to quantify all relative data during test case execution on different systems, and analyze the data to establish one or more intelligent models. The intelligent models not only process readable text output of the tested application, but also all text files and performance data of the entire system associated with running the test case. From data analysis, the models can extract suspect defect symptoms of the system derived from the running software. The models can be trained, and can run in either the test environment or production environment, so that when a suspect symptom occurs, even though there is no explicit error reported in association with running the test case, the model can prompt a warning, or take other action on the system to address the issue.

Advantageously, by quantifying all relevant data obtained during test case execution on different test systems and analyzing the test case itself, the intelligent model is established. The model can output the health of the application or software by predicting new incidents, and even fail successful test cases which have hidden anomalies when run. For instance, when running the same test case in different environments, it may show different results. For example, software can pass in the development environment, but fail in the operation environment. By analyzing the quantified data of the same test case running in different environments, common symptoms can be extracted from both environments, and the common symptoms can then be used to determine if there is an implicit anomaly or issue in one of the other system(s) or a new environment. By way of example, embodiments of the present invention include computer-implemented methods, computer systems and computer program products, where program code executing on one or more processors facilitates quantifying text output and performance data obtained with a test case running on a system, determining the possibility of an implicit anomaly, the possibility of an explicit anomaly, and determining if there is an incident in the system associated with running of the test case by leveraging the possibility of implicit anomaly and/or the possibility of explicit anomaly, and based thereon, taking an action based on the determined incident.

In one or more embodiments, a computer-implemented method of facilitating processing within a computing environment is provided. The computer-implemented method includes using a machine learning implicit-anomaly model to determine the possibility of an implicit anomaly or incident within a system based on system metrics data obtained during running of one or more test cases on the system. Further, the method includes determining, using artificial intelligence, an occurrence of an incident within the system associated with running of the one or more test cases. Determining the occurrence of the incident uses, in one or more embodiments, the determined possibility of the implicit anomaly within the system based on the system metrics data. Further, the computer-implemented method includes initiating an action based on the determining occurrence of the incident within the system associated with running of the one or more test cases.

In one or more implementations, the method further includes training the machine learning implicit-anomaly model using, at least in part, training system metrics data collected from one or more test systems running the one or more test cases.

In one embodiment, the computer-implemented method further includes obtaining the system metrics data, where obtaining the system metrics data includes generating performance-robustness data vectors from collected performance data of the system. Further, obtaining of the system metrics data includes, in one embodiment, clustering system text data logs into functional areas, and classifying the generated performance-robustness data vectors using the functional areas to obtain the system metrics data referenced by the machine learning implicit-anomaly model.

In one or more embodiments, the computer-implemented method further includes using a machine learning explicit-anomaly model to determine a possibility of an explicit anomaly within the system based on system text data obtained from running of the one or more test applications on the system, where determining the occurrence of the incident associated with running of the one or more test cases further includes using the determined possibility of explicit anomaly within the system based on the system text data in addition to the determined possibility of the implicit-anomaly within the system based on the system metrics data. In one embodiment, the system metrics data and the system text data are different types of system data collected from running of the one or more test cases on the system. In one or more implementations, the system metrics data and the system text data are time-based data vectors collected with running of the one or more test cases on the system.

In one embodiment, the computer-implemented method further includes obtaining the system metrics data, where obtaining the system metrics data includes generating performance-robustness data vectors from the collected performance data of the system, clustering system text data logs into functional areas, and classifying the generated performance-robustness data vectors using the functional areas to obtain the system metrics data referenced by the machine learning implicit-anomaly model. In one embodiment, the computer-implemented method further includes obtaining the system text data. Obtaining of the system text data can include collecting and parsing system text output obtained in association with running the one or more test cases on the system, and converting the collected and parsed system text output into text data vectors, where the system text data includes the text data vectors.

In one embodiment, the artificial intelligence includes a multilayer machine learning model, and determining the occurrence of the incident includes using the multilayer machine learning model in identifying the occurrence of the incident within the system based on the determined possibility of an implicit anomaly within the system using the system metrics data, and the determined possibility of an explicit anomaly within the system using the system text data. In one embodiment, the system is a production system, and initiating the action includes modifying operation of the system based on determining the occurrence of the incident within the system associated with running of the one or more test cases.

By way of further example, FIGS. 5-8 depict one embodiment of a test-based (or test case-based) incident detect workflow, in accordance with one or more aspects of the present invention.

Figure 5:
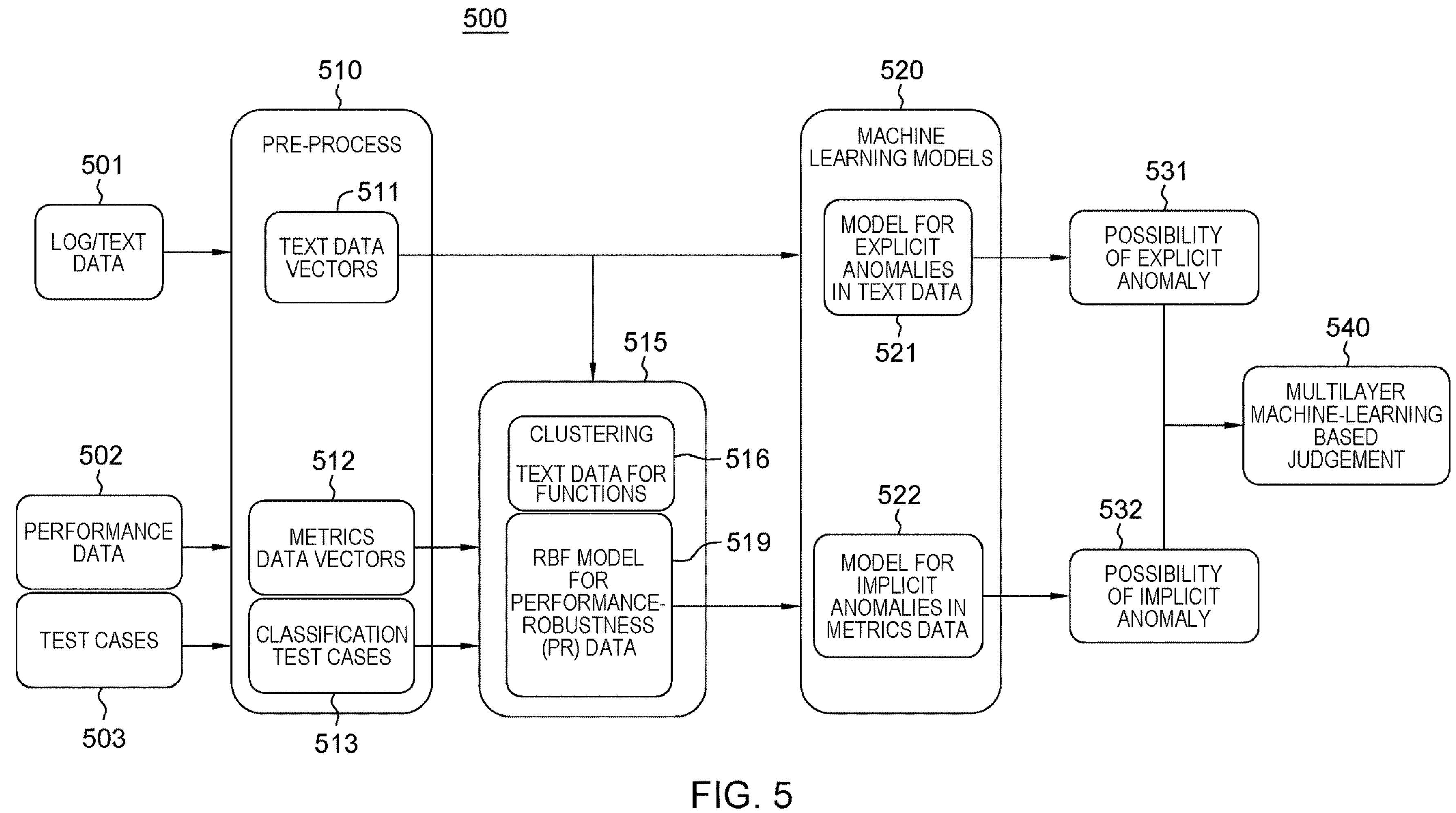
FIG. 5 depicts one embodiment of a test-based incident detect workflow, in accordance with one or more aspects of the present invention.

As illustrated, FIG. 5 depicts one embodiment of an overall incident detect workflow 500, in accordance with one or more aspects of the present invention. In the depicted embodiment, pre-processing 510 quantifies system text output 501 and performance data 502 obtained with running one or more test cases on the system, for instance, to test a new software product. The method uses machine learning models 520 to determine the possibility of an explicit anomaly 531 and/or the possibility of an implicit anomaly 532, one or both of which are then used by artificial intelligence, such as a multilayer machine learning model 540, to make a judgement or determination as to the occurrence of an incident within the system with running of the one or more test cases, and based thereon, to perform an action, such as described further with reference to FIG. 8.

As noted herein, one or more aspects of the present invention relate to determining a possibility of an implicit anomaly occurring within a system associated with running a test case to test, for instance, software or an application running on the system.

Figure 6A:
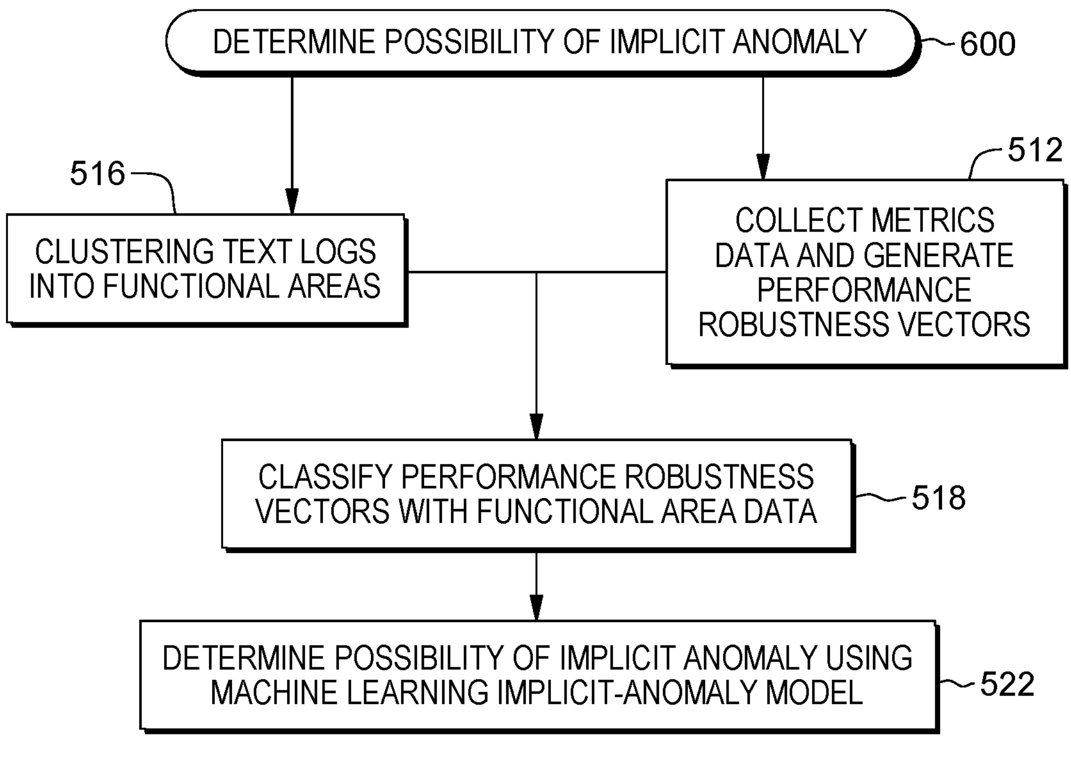
Figure 6B:
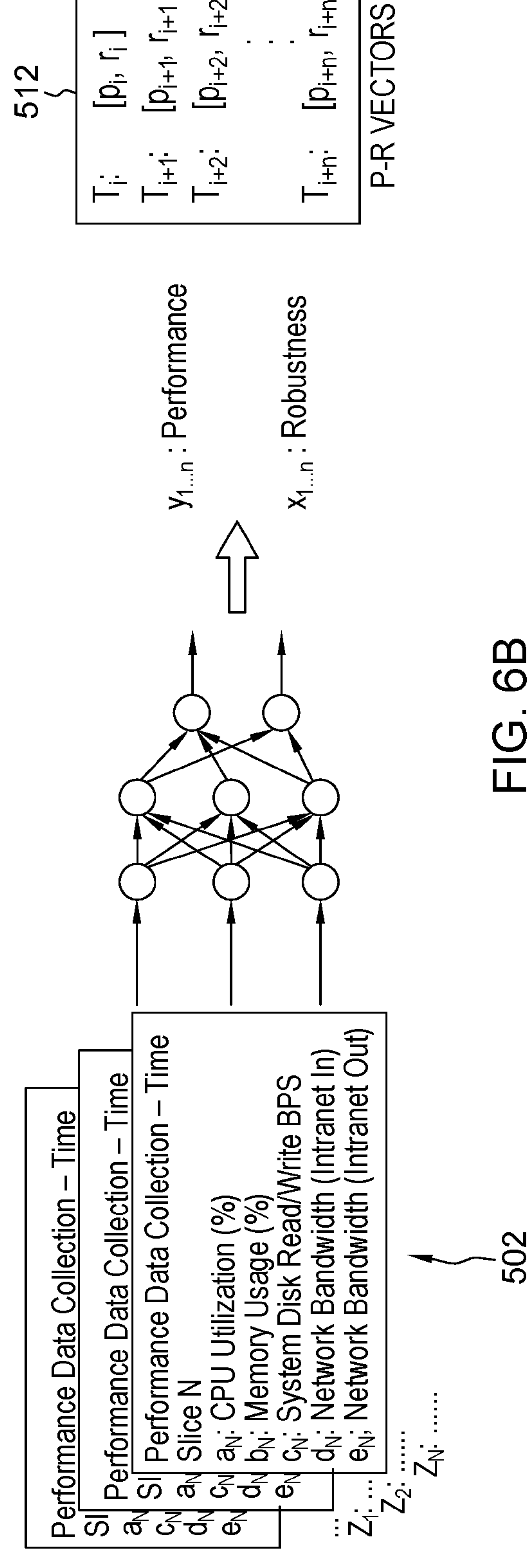
Figure 6E:
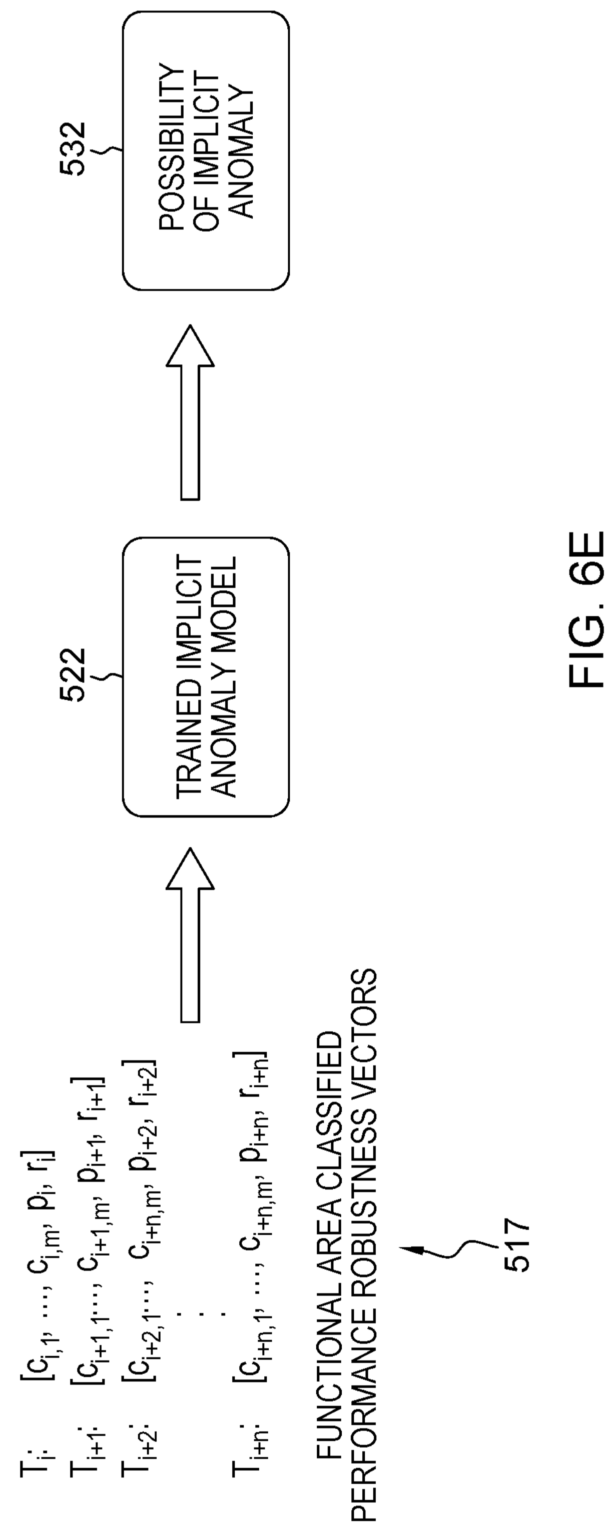

Referring collectively to FIGS. 5-6E, all relevant system performance data (or metrics data) 502 is obtained as input, along with one or more test cases 503 being run. Pre-processing 510 generates performance-robustness vectors 512 from the collected metrics data, as well as classifying the test cases 513 to facilitate implicit anomaly detection.

For instance, referring to FIG. 6A, the possibility of an implicit anomaly is determined 600 by collecting metrics data and generating performance-robustness vectors 512, an example of which is depicted in FIG. 6B. As illustrated in FIG. 6B, the metrics data can include a variety of system data, such as, CPU utilization, memory usage, system disk read/write occurrences, network bandwidth used, etc. Performance data is collected for each time slice on a system, and performance-robustness vectors are generated. The performance data is sent to the radial basis function artificial neural network to reduce the performance data to two-dimensional data, which is represented by performance-robustness. From this, the performance-robustness values for the different time segments can be determined. For instance, using the RBF model, the output of performance and robustness can be determined according to the input $a_{1 \ldots n}$, $b_{1 \ldots n}$, $c_{1 \ldots n}$, $d_{1 \ldots n}$, $z_{1 \ldots n}$. In one or more embodiments, the vectors are time-based vectors obtained during running of the test case on the system. Note that an RBF network or model is a feedforward network that includes an input layer, a hidden layer, and an output layer. The RBF network generates values within a range of values for how low or how high of an influence each system data point has on both performance and robustness. For example, one system data point may have a low influence on performance, but a high influence on robustness. On the other hand, another system data point may have a higher influence on performance, but a lower influence on robustness. An RBF network is used to obtain dimensionality reduction on the collected metrics data. For example, principal component analysis, or PCA, is a statistical procedure that can be used to make the dimensionality reduction. The goal is to reduce dimensionality of all the collected metrics data to a 2-dimension metrics. This output of the 2-dimension metrics is referred to as the performance-robustness metrics.

Referring to FIGS. 6A & 6C, determining a possibility of an implicit anomaly 600 further includes, in one embodiment, clustering text logs into functional areas 516 which can include, using the text log converted vectors 511 and a clustering model 601, such as a k-means clustering model, to cluster the text logs data into functional area vectors 516. For instance, in one or more embodiments, text log data generated by dimensionality reduction is used to perform functional clustering. The functional clusters can be determined by various factors, such as the nature of the product and type of scenario. Functional clusters can be, but are not limited to, security-related, network I/O-related, storage I/O-related, high memory usage, high CPU usage, etc. Since a case can generate multiple log entries, a case can be related to multiple clusters. The clustered text log information serves as a "tag" for the collected performance data when being processed by the machine learning model. In one embodiment, the text log clustered functional area vectors can vectorize the current functional area of each log's entry in sequence.

The performance-robustness vectors are then classified in one embodiment using the functional area data 518, as illustrated in FIGS. 6A & 6D. As shown in FIG. 6D, both the performance-robustness vectors 512 and the log clustered function area vectors 516 are used (in one embodiment) to obtain the functional area classified performance-robustness vectors 517 using, for instance, machine learning, such as the RBF (radial basis function) artificial neural network 519, which uses radial basis functions as activation functions. The output of the network is a linear combination of radial basis functions of the inputs. The process is to combine the performance-robustness vectors for the performance data and the function area vectors for the text data into one vector per time slice, such that the performance data is classified with function areas. For instance, for each time segment, there are two sets of characteristics, namely, the relevant performance-robustness vector and the relevant text log clustered functional area vector, which can be combined according to the time segment or fragment to obtain a comprehensive set of data, referred to as the function area classified performance-robustness vectors 517.

As illustrated in FIGS. 5, 6A & 6E, a machine learning implicit-anomaly model 522 is trained and used to determine possibility of an implicit anomaly 532 from the functional area classified performance-robustness vectors 517. In one embodiment, the machine learning implicit-anomaly model 522 can be implemented as a recurrent neural network (RNN) which uses, for instance, time-series data or sequential data. In one embodiment, the recurrent neural network can be a long short-term memory (LSTM) neural network configured to detect an implicit anomaly in the system metrics data with running of the one or more test cases on the system.

In addition to determining possibility of an implicit anomaly, processing disclosed herein also determines (in one or more embodiments) possibility of an explicit anomaly 700 from system text data obtained with running of the one or more test cases on the system, as illustrated in FIGS. 5 & 7A-7D.

Referring collectively to FIGS. 5 & 7A-7D, in one embodiment, the process includes collecting and parsing text output files 501. By way of example, log collectors can collect all relevant text output of the system, such as return codes, logs, traces, text messages, etc., with various log files being depicted in FIG. 7B, by way of example only. In one embodiment, collecting and parsing the text output files can include obtaining metadata 702 provided by, for instance, an individual or ascertained by the computing environment itself by extracting available metadata. The metadata and the collected log data are used by a parser 701 to generate a sequence of text data entries 703. For instance, in one embodiment, with metadata, a log parser can process text log data into the sequence of text data entries 703.

Figure 7A:
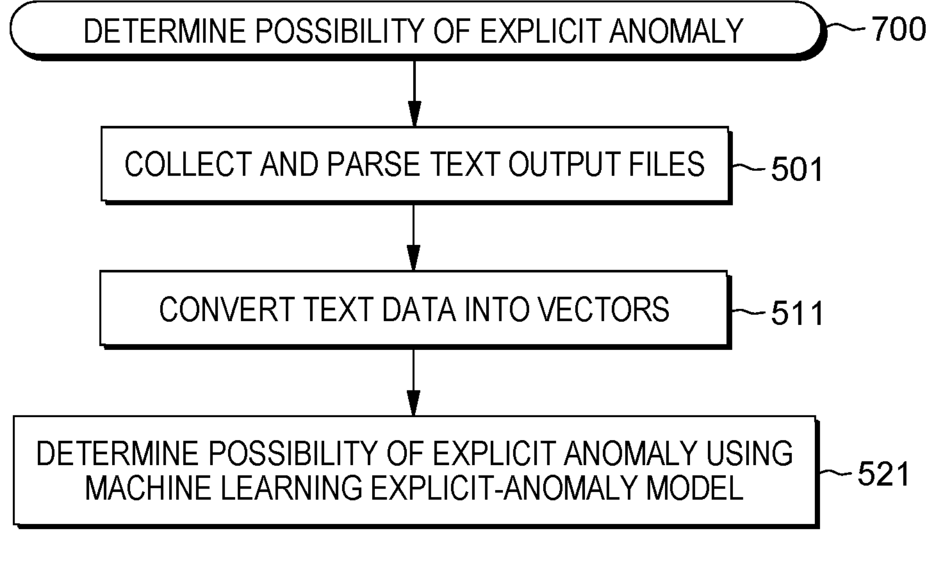
FIGS. 7A-7D depict one embodiment of a workflow for determining a possibility of an explicit anomaly within a system based on system text data obtained from running of one or more test cases on the system, in accordance with one or more aspects of the present invention.
Figure 7B:
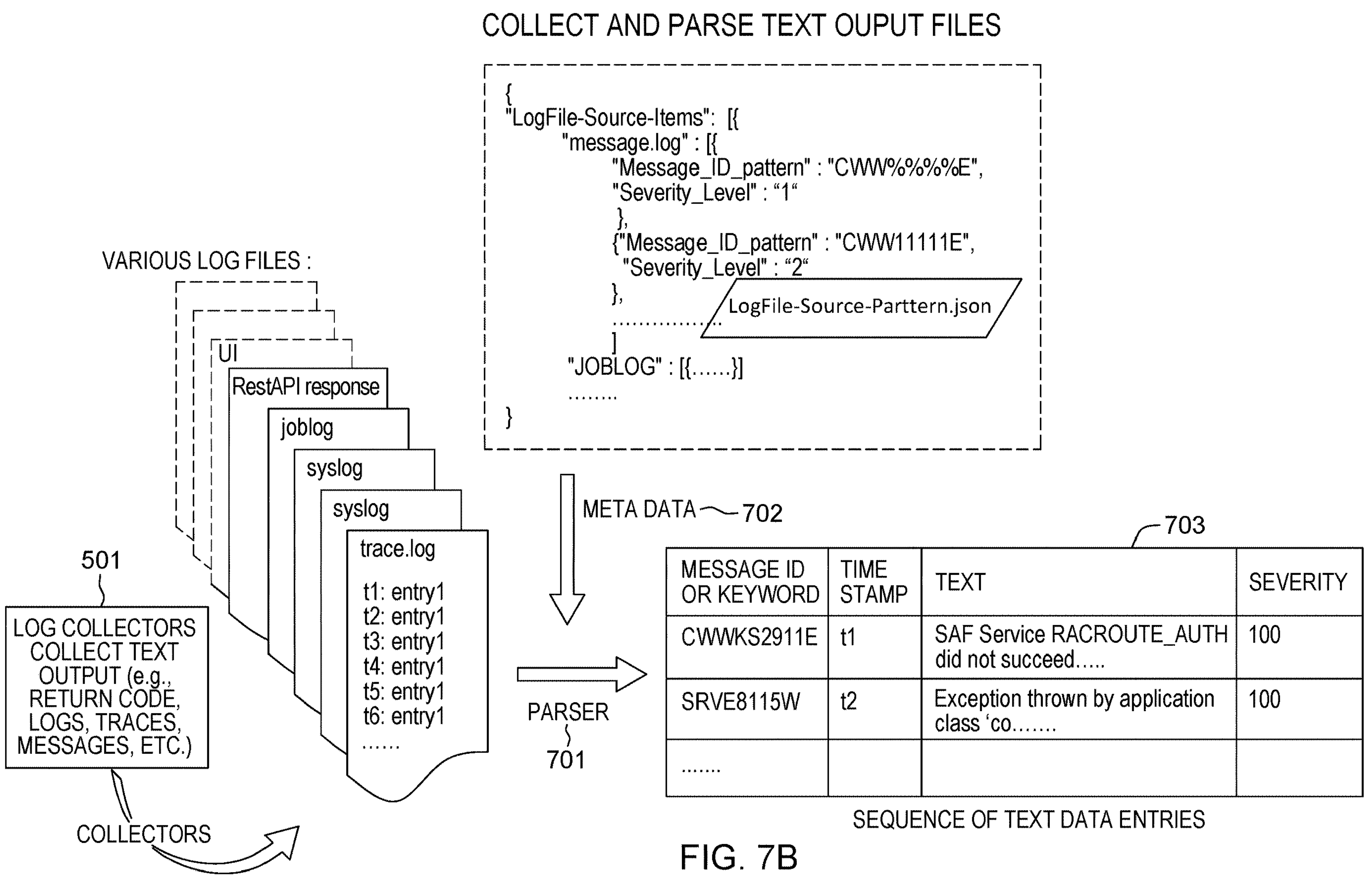
Figure 7C:
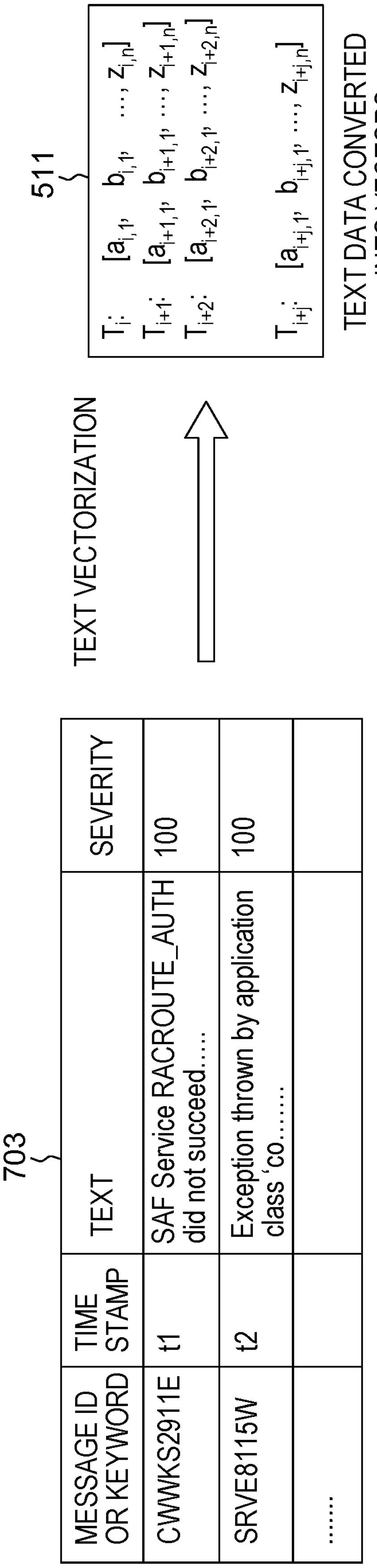

As illustrated in FIGS. 7A & 7C, the text data is converted into vectors 511 by vectorizing the sequence of text data entries 703 into vectors. Symptoms of an incident, for instance, error return code, exceptions, can be vectorized. All text information generated, for instance, at time $T_i$, is vectorized and saved in $T_i$[ . . . ]. In particular, $T_i$[ . . . ], contains all vectorized text data generated at time $T_i$. Beyond 1-of-N encoding can be used, in one embodiment, to vectorize the sequence of text data entries.

Figure 7D:
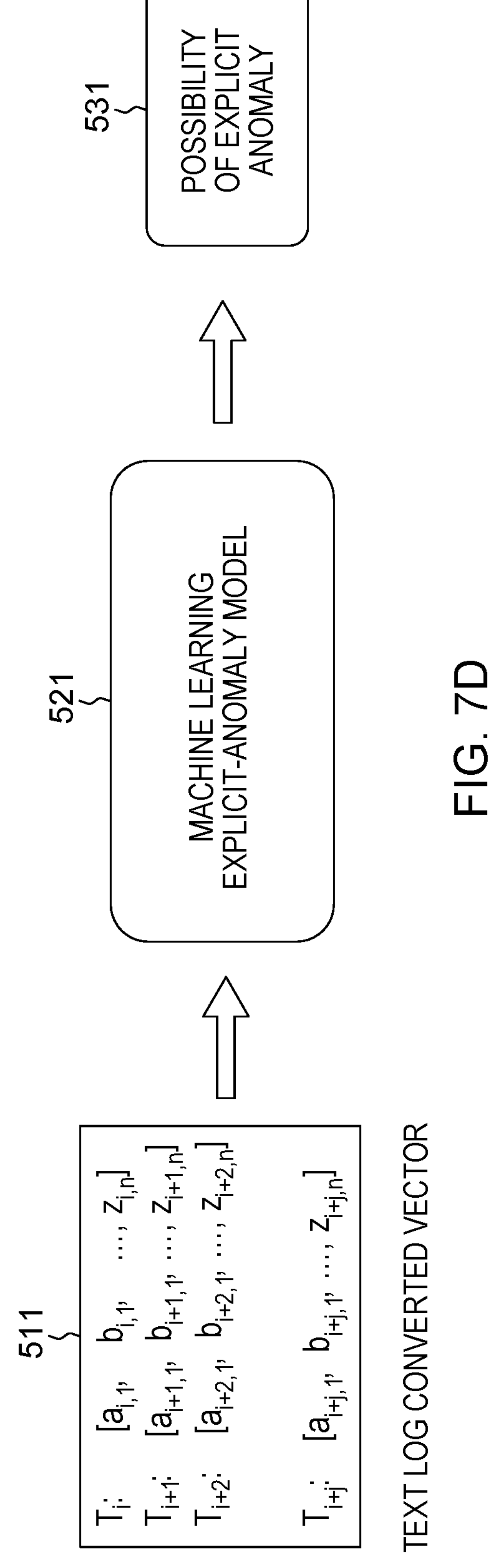

As illustrated in FIGS. 7A & 7D, the possibility of an explicit anomaly can be determined using a trained machine learning explicit-anomaly model 521. In particular, the text log converted vectors 511, which contain the vectorized "symptoms", can be sent to the trained machine learning explicit-anomaly model 521, which in one embodiment, is a pre-trained, recurrent neural network (RNN) model used to determine if there is an explicit anomaly at time $T_x$. The machine learning explicit-anomaly model 521 provides a determination of a possibility of explicit anomaly 531 as an output for the different time slices. In one embodiment, the possibility of explicit anomaly can be a value between a closed interval, such as [0,1]. The larger the value is, the higher the possibility or probability that there is an explicit anomaly in the text log converted vectors for the time slice. In one embodiment, the recurrent neural network (RNN) used for the machine learning explicit-anomaly model can be another long short-term memory (LSTM) network. In one or more implementations, the machine learning explicit-anomaly model can be trained using training data collected on one or more test systems running one or more test cases. The collected data is converted to vectors, with each vector representing a collected text sequence. Similar to a supervised deep learning model, there is an output column, where the column represents whether the input vector is in error, with 1 meaning the input is in error, and 0 meaning the input is not in error (in one example). To improve efficiency, the actual value of the column can be processed by a function, and for instance, output 1 or 0, as appropriate. A similar process can be used for determining the possibility of implicit anomaly, described above.

Figure 8:
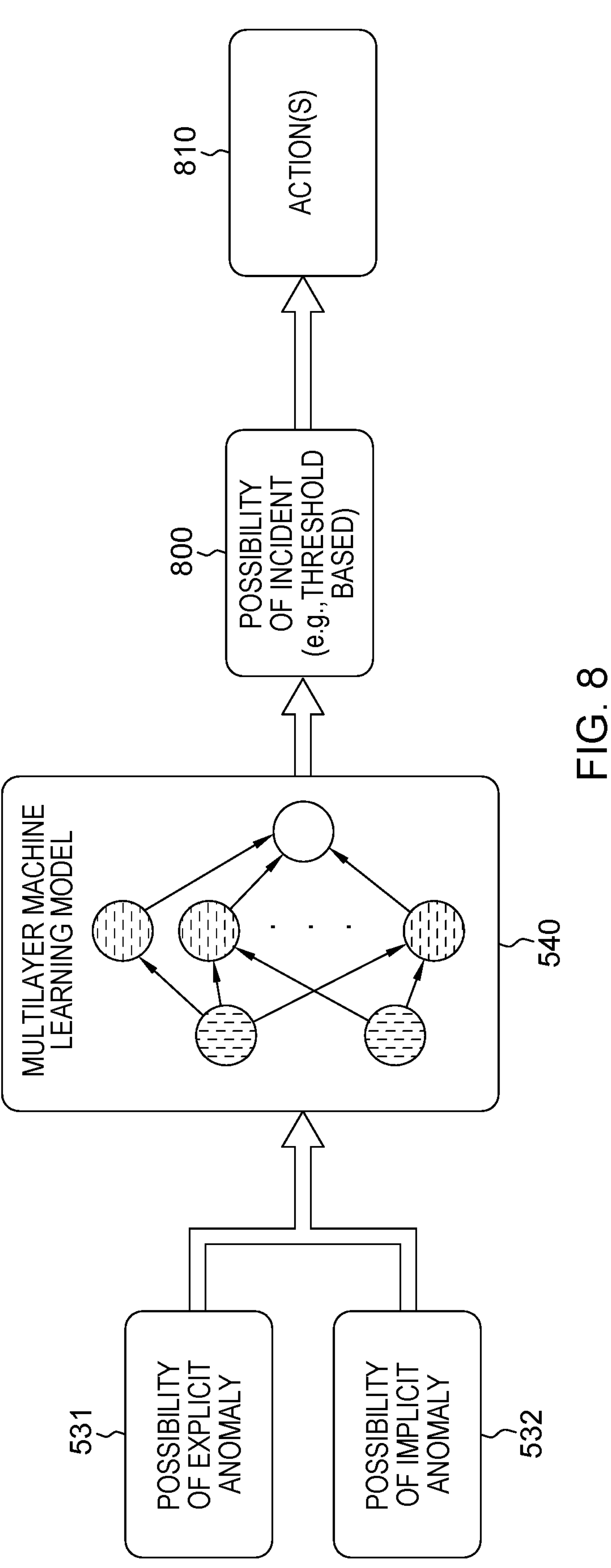
FIG. 8 depicts one embodiment of an artificial-intelligence-based process for determining occurrence of an incident within the system using the possibility of implicit anomaly and possibility of explicit anomaly, and taking action based thereon, in accordance with one or more aspects of the present invention.

As illustrated in FIGS. 5 & 8, in one embodiment, the determined possibility of explicit anomaly 531 values and the determined possibility of implicit anomaly 532 values are used by artificial intelligence, such as a multilayer machine learning model, to make a judgment or determination as to whether there is an incident or error in the system within the different time segments with running of the one or more test cases on the system 540. In one embodiment, multilayer machine learning model 540 is a pre-trained multilayer neural network that can be used to determine the possibility of an incident, for instance, either from the possibility of explicit anomaly 531, the possibility of implicit anomaly 532, or both the possibility of explicit anomaly 531 and the possibility of implicit anomaly 532. Multilayer machine learning model 540 outputs a determination of a possibility of incident 800, which can be a threshold-based determination. In one embodiment, the possibility of incident can be a value between a closed interval [0,1]. The larger the value is, the higher the possibility or probability there is an incident. When an incident threshold is reached, and an incident is identified, one or more actions 800 can be initiated. For instance, if the possibility of incident is greater than a specified threshold, then one or more predefined actions can be automatically implemented.

By way of example, in one or more embodiments, during a pre-learning phase, performance metrics data can be collected on the system with running of the one or more test cases. The collected data can be a per-time slice collection of data. Each performance data collection is then weighted into a performance-robustness value through a neural network, such as the above-noted RBF model. Using the RBF model, the output of performance and robustness can be calculated according to the input. The performance-robustness data for all the time slices is then clustered into performance states on cartesian coordinates (in one embodiment) using a mean-shift algorithm, in one embodiment. For instance, the clustered states can include CPU usage, memory usage, I/O high utilization, balance resource, memory exhausted, CPU competition, network I/O competition, storage I/O competition, with the particular states at issue varying for different systems. Performance data mask clusters can be created by analyzing the results for each performance category per performance state. For instance, where the cluster relates to memory exhaustion, the work-around or action can be to automatically temporarily assign more memory to the system, to mount a faster backup storage as a SWAP space, and/or notify applications to save data immediately in case program memory gets recycled by the system, which can result in loss of data. The particular action, or alert to be reported, can be predefined based on particular predefined mediation actions or options available for each performance state determined from the data.

Advantageously, the overall incident detect workflow of FIGS. 5-8 can be run on both test systems and production systems. In addition, when training one or more of the models, both test systems and production systems can be used. When run on a test system, the incident detect workflow presented can assist with the software development and test organization discovery of implicit program defects. When run on the production system, in conjunction with dynamic tuning capabilities such as described, the workflow can initiate an action to address the incident, and thereby extend operation of the production system, in one or more embodiments. For instance, where the incident relates to processing workflow, one or more CPU resources can be reassigned, and/or one or more memory resources can be reassigned, etc., to address the performance-related incident.

Note further that, in one or more embodiments, the protection system can be treated as a special type or configuration of the test system. Technically, there should be minimal differences between the test system(s) and the production system(s). However, running the one or more test cases on the production system typically involves processing real data, while running one or more test cases on a test system involves the use of predefined test data. In one or more implementations, the machine learning models described herein can be configured to continually learn with use of the test cases on one or more test systems and/or one or more production systems. In this manner, the machine learning models can be further refined over time. In one embodiment, the models can be continuously trained with incident or defect data from the test system and, for instance, feedback or service ticket data from the production system. For continued learning of the models, the possibility of incident decision or judgement can be used to improve the explicit-anomaly model severity determination process. For instance, most messages will have their own severity level, such as info, warning, error, exception, etc. Typically, an explicit anomaly should only report errors or exceptions. However, if a warning or info-message always results in a final incident judgment, then the severity of that message can be raised. Similarly, the final judgement result can also be fed back to improve the implicit-anomaly model.

Other aspects, variations and/or embodiments are possible.

The computing environments described herein are only examples of computing environments that can be used. Other environments may be used; embodiments are not limited to any one environment. Although various examples of computing environments are described herein, one or more aspects of the present invention may be used with many types of environments. The computing environments provided herein are only examples.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, other types of neural networks may be considered. Further, other scenarios may be contemplated. Many variations are possible.

Various aspects and embodiments are described herein. Further, many variations are possible without departing from a spirit of aspects of the present invention. It should be noted that, unless otherwise inconsistent, each aspect or feature described and/or claimed herein, and variants thereof, may be combinable with any other aspect or feature.

The terminology used herein is for the purpose of describing particular embodiments only and is not intended to be limiting of the invention. As used herein, the singular forms “a”, “an” and “the” are intended to include the plural forms as well, unless the context clearly indicates otherwise. It will be further understood that the terms “comprise” (and any form of comprise, such as “comprises” and “comprising”), “have” (and any form of have, such as “has” and “having”), “include” (and any form of include, such as “includes” and “including”), and “contain” (and any form contain, such as “contains” and “containing”) are open-ended linking verbs. As a result, a method or device that “comprises”, “has”, “includes” or “contains” one or more steps or elements possesses those one or more steps or elements, but is not limited to possessing only those one or more steps or elements. Likewise, a step of a method or an element of a device that “comprises”, “has”, “includes” or “contains” one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method of facilitating processing within a computing environment, the computer-implemented method comprising:

obtaining system metrics data generated during executing one or more test cases configured to test functionality within a system;

using a machine learning implicit-anomaly model to determine a possibility of an implicit anomaly associated with executing the one or more test cases within the system;

determining, using artificial intelligence, an occurrence of an incident within the system based on detecting an anomaly that is not indicated by a result of executing the one or more test cases within the system, wherein detecting the anomaly uses the determined possibility of the implicit anomaly within the system based on the system metrics data; and initiating an action based on the occurrence of the incident within the system associated with detecting the anomaly not indicated by the result, and despite the one or more test cases completing successfully.

2. The computer-implemented method of claim 1, further comprising:

training the machine learning implicit-anomaly model using training system metrics data collected from one or more test systems executing the one or more test cases.

3. The computer-implemented method of claim 1, wherein obtaining of the system metrics data comprises:

generating performance-robustness data vectors from collected performance data of the system.

4. The computer-implemented method of claim 3, wherein obtaining the system metrics data further comprises:

clustering system text data logs into functional areas; and classifying the generated performance-robustness data vectors using the functional areas to obtain the system metrics data referenced by the machine learning implicit-anomaly model.

5. The computer-implemented method of claim 1, further comprising:

using a machine learning explicit-anomaly model to determine a possibility of an explicit anomaly within the system based on system text data obtained from executing the one or more test cases on the system; and wherein determining the occurrence of the incident associated with executing the one or more test cases further comprises using the determined possibility of the explicit anomaly within the system based on the system text data in addition to the determined possibility of the implicit anomaly within the system based on the system metrics data, wherein the system metrics data and the system text data are different types of system data collected from executing the one or more test cases on the system.

6. The computer-implemented method of claim 5, wherein obtaining of the system metrics data comprises:

generating performance-robustness data vectors from collected performance data of the system;

clustering system text data logs into functional areas; and classifying the generated performance-robustness data vectors using the functional areas to obtain the system metrics data referenced by the machine learning implicit-anomaly model.

7. The computer-implemented method of claim 6, wherein obtaining of the system text data comprises:

collecting and parsing system text output obtained from executing the one or more test cases on the system; and converting the collected and parsed system text output into text data vectors, the system text data comprising the text data vectors.

8. The computer-implemented method of claim 5, wherein the artificial intelligence comprises a multilayer machine learning model, and wherein determining the occurrence of the incident comprises using the multilayer machine learning model in determining the occurrence of the incident within the system based on the determined possibility of implicit anomaly within the system using the system metrics data, and the determined possibility of explicit anomaly within the system using the system text data.

9. The computer-implemented method of claim 1, wherein the system is a production system and initiating the action comprises modifying operation of the system based on determining the occurrence of the incident within the system associated with executing the one or more test cases.

10. A computer system for facilitating processing within a computing environment, the computer system comprising:

a memory; and at least one processor in communication with the memory, wherein the computer system is configured to perform a method, the method comprising:

obtaining system metrics data generated during executing one or more test cases configured to test functionality within a system;

using a machine learning implicit-anomaly model to determine a possibility of an implicit anomaly associated with executing the one or more test cases within the system;

determining, using artificial intelligence, an occurrence of an incident within the system based on detecting an anomaly that is not indicated by a result of executing the one or more test cases within the system, wherein detecting the anomaly uses the determined possibility of the implicit anomaly within the system based on the system metrics data; and initiating an action based on the occurrence of the incident within the system associated with detecting the anomaly not indicated by the result, and despite the one or more test cases completing successfully.

11. The computer system of claim 10, further comprising:

training the machine learning implicit-anomaly model using training system metrics data collected from one or more test systems executing the one or more test cases.

12. The computer system of claim 10, wherein obtaining of the system metrics data comprises:

generating performance-robustness data vectors from collected performance data of the system;

clustering system text data logs into functional areas; and classifying the generated performance-robustness data vectors using the functional areas to obtain the system metrics data referenced by the machine learning implicit-anomaly model.

13. The computer system of claim 10, further comprising:

using a machine learning explicit-anomaly model to determine a possibility of an explicit anomaly within the system based on system text data obtained from executing the one or more test cases on the system; and wherein determining the occurrence of the incident associated with executing the one or more test cases further comprises using the determined possibility of the explicit anomaly within the system based on the system text data in addition to the determined possibility of the implicit anomaly within the system based on the system metrics data, wherein the system metrics data and the system text data are different types of system data collected from executing the one or more test cases on the system.

14. The computer system of claim 13, wherein obtaining of the system metrics data comprises:

generating performance-robustness data vectors from collected performance data of the system;

clustering system text data logs into functional areas; and classifying the generated performance-robustness data vectors using the functional areas to obtain the system metrics data referenced by the machine learning implicit-anomaly model.

15. The computer system of claim 14, wherein obtaining of the system text data comprises:

collecting and parsing system text output obtained from executing the one or more test cases on the system; and converting the collected and parsed system text output into text data vectors, the system text data comprising the text data vectors.

16. The computer system of claim 13, wherein the artificial intelligence comprises a multilayer machine learning model, and wherein determining the occurrence of the incident comprises using the multilayer machine learning model in determining the occurrence of the incident within the system based on the determined possibility of implicit anomaly within the system using the system metrics data, and the determined possibility of explicit anomaly within the system using the system text data.

17. A computer program product for facilitating processing within a computing environment, the computer program product comprising:

one or more computer-readable storage media and program instructions collectively stored on the one or more computer-readable storage media readable by at least one processing circuit to cause the processing circuit to perform a method comprising:

obtaining system metrics data generated during executing one or more test cases configured to test functionality within a system;

using a machine learning implicit-anomaly model to determine a possibility of an implicit anomaly associated with executing the one or more test cases within the system;

determining, using artificial intelligence, an occurrence of an incident within the system based on detecting an anomaly that is not indicated by a result of executing the one or more test cases within the system, wherein detecting the anomaly uses the determined possibility of the implicit anomaly within the system based on the system metrics data; and initiating an action based on the occurrence of the incident within the system associated with detecting the anomaly not indicated by the result, and despite the one or more test cases completing successfully.

18. The computer program product of claim 17, further comprising:

training the machine learning implicit-anomaly model using training system metrics data collected from one or more test systems executing the one or more test cases.

19. The computer program product of claim 17, further comprising:

using a machine learning explicit-anomaly model to determine a possibility of an explicit anomaly within the system based on system text data obtained from executing the one or more test cases on the system; and wherein determining the occurrence of the incident associated with executing the one or more test cases further comprises using the determined possibility of the explicit anomaly within the system based on the system text data in addition to the determined possibility of the implicit anomaly within the system based on the system metrics data, wherein the system metrics data and the system text data are different types of system data collected from executing the one or more test cases on the system.

20. The computer program product of claim 19, wherein the artificial intelligence comprises a multilayer machine learning model, and wherein determining the occurrence of the incident comprises using the multilayer machine learning model in determining the occurrence of the incident within the system based on the determined possibility of implicit anomaly within the system using the system metrics data, and the determined possibility of explicit anomaly within the system using the system text data.

* * * * *